(12) United States Patent
Ashe

(10) Patent No.: US 6,784,660 B2
(45) Date of Patent: Aug. 31, 2004

(54) MAGNETIC POSITION AND ORIENTATION MEASUREMENT SYSTEM WITH MAGNETIC FIELD PERMEABLE ATTENUATOR

(75) Inventor: Westley Ashe, Milton, VT (US)

(73) Assignee: Ascension Technology Corporation

( * ) Notice: Subject to any disclaimer, the term of this patent is extended or adjusted under 35 U.S.C. 154(b) by 0 days.

(21) Appl. No.: 10/098,517

(22) Filed: Mar. 18, 2002

(65) Prior Publication Data

US 2003/0173953 A1 Sep. 18, 2003

(51) Int. Cl.$^7$ ................................................ G01B 7/30
(52) U.S. Cl. .......................... 324/207.17; 324/207.12; 324/207.23
(58) Field of Search ................ 324/207.17, 207.23, 324/207.16, 239, 225, 207.12, 207.14, 207.24, 207.26; 128/899; 336/84 R

(56) References Cited

U.S. PATENT DOCUMENTS 5,767,669 A * 6/1998 Hansen et al. ......... 324/207.12
6,246,231 B1 * 6/2001 Ashe ...................... 324/207.17
6,528,991 B2 * 3/2003 Ashe ...................... 324/207.17

* cited by examiner

Primary Examiner—Jay Patidar
Assistant Examiner—Darrell Kinder
(74) Attorney, Agent, or Firm—H. Jay Spiegel

(57) ABSTRACT

A transmitter assembly includes a sandwich made up of a three axis transmitter, driven by a transmitter driver, mounted on a permeable attenuator with a spacer interposed between the transmitter and the attenuator. The attenuator is mounted on top of a conductive plate. A compensation coil is provided and driven by a compensation coil driver that energizes the compensation coil to optimize compensation for magnetic field edge effects. A number of individual compensation coils may be arranged about the periphery of the conductive plate or permeable attenuator. The individual compensation coils in the modification may be activated in tandem or individually to compensate for non-uniform magnetic edge fields caused by he non-symmetrical configuration of, for example, three transmitter coils or, for example, a square permeable attenuator rather than a circular permeable attenuator.

44 Claims, 2 Drawing Sheets

US 6,784,660 B2

MAGNETIC POSITION AND ORIENTATION MEASUREMENT SYSTEM WITH MAGNETIC FIELD PERMEABLE ATTENUATOR

BACKGROUND OF THE INVENTION

The present invention relates to a low distortion magnetic transmitter and method of operating. The present invention comprises an improvement over Applicant's prior U.S. Pat. No. 6,246,231 issued Jun. 12, 2001. In the prior patent, a three axis transmitter is placed on top of a thin permeable barrier placed on a conductive plate. Disclosure is made of operation of the device with or without the conductive plate. As disclosed, magnetic fields are attenuated in areas outside the volume where position and orientation measurements are to be conducted, particularly in areas where metallic objects are commonly found that might cause eddy current distortion.

Applicant has found that the performance of the device disclosed in Applicant's prior patent may be improved through the addition of a current loop about the periphery of the transmitter to nullify edge effect fields while also eliminating undesired excitations in conductive materials below the transmitter as well as below and adjacent the desired operating volume.

SUMMARY OF THE INVENTION

The present invention relates to a low distortion magnetic transmitter and method of operating. The transmitter is intended to permit measuring the position of a receiving antenna with respect thereto using magnetic fields and, preferably, in six degrees of freedom. The six degrees of freedom are the three coordinate directions, x, y and z, and the three orientation aspects commonly described as pitch, roll and yaw.

The present invention includes the following interrelated objects, aspects and features:

(1) In a first embodiment of the present invention, a sandwich is made up of a three axis transmitter mounted on a permeable attenuator with a spacer interposed between the transmitter and the attenuator. The attenuator is mounted on top of a conductive plate. About the periphery of the conductive plate or the permeable attenuator, a compensation coil is provided that is driven by a compensation coil driver different from the transmitter driver.

(2) The compensation driver is operated in a manner described in greater detail below to energize the compensation coil in a way to optimize compensation for magnetic field edge effects. Aspects taken into account in determining how to energize the compensation driver include the number and configuration of the transmitter coils, the shape and thickness of the magnetic attenuator, and the relationship between the magnetic attenuator and the conductive plate on which it is placed.

(3) In a second embodiment, instead of a single compensation coil about the periphery of the conductive plate, a number of individual compensation coils may be arranged about the periphery of the conductive plate or permeable attenuator, with the configuration of the compensation coils being designed based upon the factors set forth above, namely, the number and configuration of the transmitter coils, the shape of the permeable attenuator, and the configuration of the conductive plate with regard thereto.

(4) The individual compensation coils in the second embodiment may be activated in tandem or individually to compensate for non-uniform magnetic edge fields caused by the non-symmetrical configuration of, for example, three transmitter coils or, for example, a square permeable attenuator rather than a circular permeable attenuator.

As such, it is a first object of the present invention to provide a low distortion magnetic transmitter and method of operating.

It is a further object of the present invention to provide such a device wherein a three axis flat transmitter is employed.

It is a still further object of the present invention to provide such a device in which the transmitter is placed on a thin permeable attenuator.

It is a yet further object of the present invention to provide such a device in which the permeable attenuator is placed on top of a conductive plate.

It is a yet further object of the present invention to provide such a device in which a conductive coil is located about the periphery of the permeable attenuator or conductive plate.

It is a still further object of the present invention, in another embodiment thereof, to provide a plurality of compensation coils about the periphery of the permeable attenuator or conductive plate.

It is a still further object of the present invention to provide separate drivers for the transmitters and conductive plate(s).

It is a still further object of the present invention to provide such an invention in which the method of operating is also claimed.

These and other objects, aspects and features of the present invention will be better understood from the following detailed description of the preferred embodiments when read in conjunction with the appended drawing figures.

SPECIFIC DESCRIPTION OF THE PREFERRED EMBODIMENTS

Figure 1:
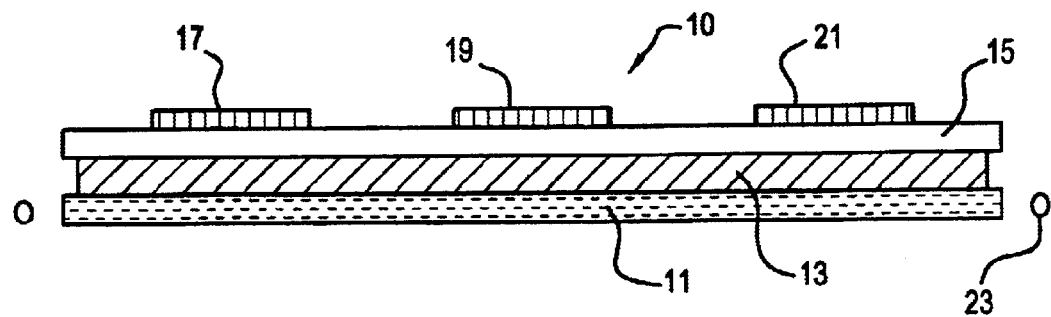
FIG. 1 shows a side view of a first embodiment of the present invention.

Reference is first made to FIG. 1 which shows a first embodiment of the present invention generally designated by the reference numeral 10 and including a conductive plate 11 on which is placed a permeable attenuator 13. A spacer 15 is provided above the permeable attenuator 13. Placed on the spacer 15 are a plurality of transmitter loops 17, 19 and 21 that may comprise a three axis magnetic transmitter. The spacer 15 is provided to desensitize the transmitter loops 17, 19 and 21 with respect to the distance from the permeable attenuator 13 so that minute changes in the distance from the transmitter loops 17, 19 and 21 to the permeable attenuator 13 do not substantially affect the intensity or shape of transmitted magnetic fields.

In the preferred embodiment, the permeable attenuator is made of a highly permeable mumetal such as, for example, that which is described by the identifier MU-80. The barrier thickness is chosen such that a desired level of isolation between the transmitter and metallic objects beneath it is achieved. In one preferred embodiment, the thickness of the permeable attenuator may be in the range of 0.025 inches in thickness.

In the first embodiment, the conductive plate 11 is concentric, located directly below and substantially in contact with the permeable attenuator 13. A preferred material for the conductive plate 11 is an aluminum alloy known as "6061 T-6." The material thickness is chosen such that it either provides adequate mechanical support for the transmitter coils and/or a desired additional level of attenuation of transmitted field components which may leak through the permeable attenuator. In the preferred embodiment, the thickness of the conductive plate 11 is in the range of 0.25 inches.

The diameter of transmitter loops 17, 19 and 21 is chosen to provide a suitable operating volume for a given application. In the preferred embodiment, each of the transmitter loops 17, 19 and 21 may have a diameter of 10 inches.

A compensation coil 23 is provided about the periphery of the assembly 10. If desired, the compensation coil 23 may be located about the periphery of either the conductive plate 11 or the permeable attenuator 13. In the first embodiment of the present invention, a single compensation coil 23 is employed.

Figure 2:
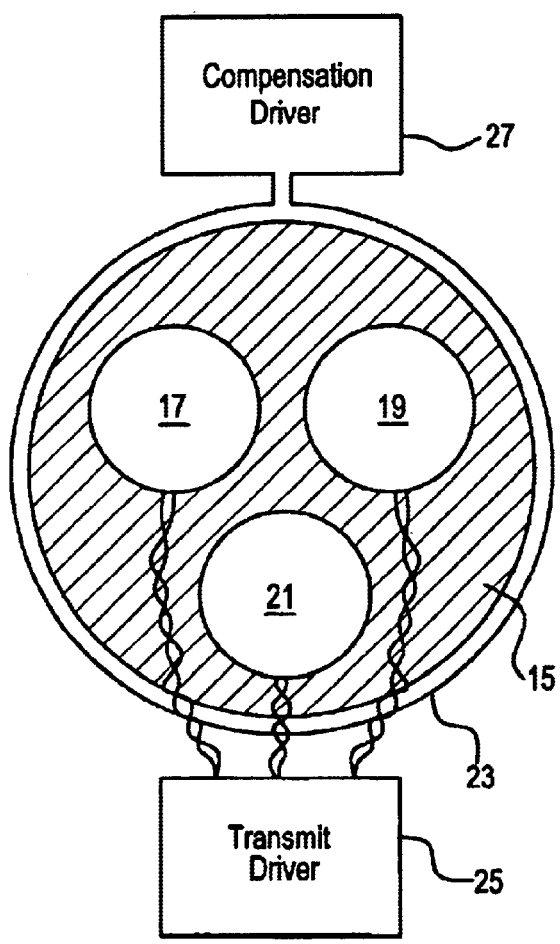
FIG. 2 shows a top schematic representation of the embodiment of FIG. 1 showing the connection of the transmitter driver and compensation coil driver.

With reference to FIG. 2, the transmitters 17, 19 and 21 are driven by a transmitter driver 25 that is electrically connected to each transmitter and drives them individually in sequential order as pre-programmed as is understood by those of ordinary skill in the art. The compensation coil 23 is driven by a compensation driver 27. The compensation driver 27 produces current in the compensation coil 23 with a magnitude that produces a field specifically designed to minimize the eddy current field about the periphery of the transmitter assembly consisting of the conductive plate 11, the permeable attenuator 13, the spacer 15, and the transmitter coils 17, 19 and 21.

At the peripheral edge of permeable attenuator 13, there is a substantial magnetic field which tends to induce eddy currents in conductive plate 11. These induced eddy currents produce a phase shifted magnetic field for AC transmitter excitation, and an exponentially decaying magnetic field for a pulsed DC excitation. These eddy current fields may produce undesired distortions on the magnetic field within the operating volume. Providing a peripheral compensating coil 23 around the edge of permeable attenuator 13 and energizing the compensating coil 23 with an optimum current will cancel these undesired eddy currents in conductive plate 11. Applicant has found that the most effective method of determining this optimum current is to create a finite element model of the transmitter assembly 10, including compensation coil 23, and to vary as a model parameter the current in compensating coil 23 until the eddy current around the periphery of conductive plate 11 is minimized. It has been found that this method is both easily performed and highly accurate. Using this method, the primary objective is to cancel the parasitic eddy currents induced around the edges of conductive plate 11. While the magnetic field level adjacent to and below transmitter assembly 10 will decrease and thus provide a performance benefit, it is not, in this case, the output quantity which the model parameters are adjusted to minimize.

In one example, it was found that to minimize eddy currents in conductive plate 11, compensating coil 23 should be located around the peripheral edge of conductive plate 11, should be made of 16AWG wire, and should be driven with the same current amplitude as that used to drive transmitter coils 17, 19 and 21.

Due to widely varied construction requirements and required applications of transmitter assembly 10, it is not practical to describe a single optimization process. In general, the optimal excitation and location of compensating coil 23 with respect to permeable attenuator 13 and, if present, conductive plate 11, is an iterative process. The region in which it is desired to minimize the magnetic field is selected, generally being at some level below and/or adjacent to transmitter assembly 10.

A first finite element model of transmitter assembly 10 is created, including permeable attenuator 13 and compensating coil 23. In this example, Applicant uses the construction of the first embodiment. Initially, compensating coil 23 is located along the outside of the peripheral edge of conductive plate 11, and is not energized. Applicant will be seeking a minimal magnetic field two inches adjacent to transmitter assembly 10, in the positive X direction. The model is simulated, and the field is measured at the desired point.

Next, the model is re-run with compensating coil 23 energized with the same current as transmitter coils 17, 19 and 21. The finite element analysis solution is then evaluated. The level of the magnetic field is observed at the desired point. In this case, the model will indicate that the field is 8 times smaller than on the first run. Applicant then adjusts the current in compensating coil 23 to be 1.5 times the level used in the first iteration, and re-run the solution. The value at the desired point is now 6 times smaller and in the opposite direction to the first run, which indicates that the compensating current level was too high. This process is repeated until Applicant finds that when compensating coil 23 is driven with a current level 1.31 times that of transmitter coils 17, 19 and 21, the magnetic field value at the desired point is 29 times smaller than the first simulation.

Instead of or in addition to varying the current in compensating coil 23, Applicant may adjust its location, shape, number of turns, location of permeable attenuator 13 with respect to transmitter coils 17, 19 and 21, or the location of conductive plate 11. Basically, there are many parameters which can have an affect on the optimization process, and the best combination requires some degree of experimentation.

In cases where a single loop cannot provide adequate minimization of magnetic fields in an area below and/or adjacent to transmitter assembly 10 due to non-uniform distribution of field around the edge of permeable attenuator 13, it becomes necessary to form compensating coil 23 with a number of separate compensating coils. The size, placement, shape, and excitation of these coils is determined using the optimization process used for a single loop.

In calibrating the transmitter assembly 10, the field contribution of the compensation coil 23 is included in the field mapping process. This calibration will remain valid so long as the physical configuration of the assembly 10 does not change, and so long as the characteristics of the current that was used in calibrating the compensation coil 23 are maintained.

Under certain circumstances, it may be advantageous to adjust the current supply and/or number of turns on the compensation coil 23 to cancel magnetic fields at one or more points adjacent to or below the transmitter assembly 10. Determination of the exact location of the number of turns of the compensation coil 23 and the characteristics of the current delivered thereto are determined by the transmitter excitation method employed by the transmitter driver 25, the specific constructional configuration of the transmitter assembly 10 including the coils 17, 19 and 21, as well as with regard to the properties and locations of metallic objects below and adjacent to the transmitter assembly 10 that might be likely to create distortions in the magnetic field emanating from the transmitter assembly 10.

The characteristics of the current including the current level delivered to the compensation coil 23 are adjusted for optimal performance with respect to each of the transmitter loops 17, 19 and 21. This adjustment is highly desirable, particularly where the transmitter assembly 10 is not symmetrical as compared to the configuration of the individual transmitter loops 17, 19 and 21. For example, where circular transmitter coils are mounted on a square permeable attenuator 13, a lack of symmetry exists. In such a case, the magnetic field edge effects on the permeable attenuator 13 vary in the regions of each respective transmitter coil 17, 19 and 21. In such a configuration, the compensation driver 27 is operated to vary the current level into the compensation coil 23 so that the current level is unique for each transmitter coil that is energized, depending upon which one is energized. The level of energization may be optimized to produce a minimal magnetic field in a strategic region outside the operating volume, where metallic objects typically reside in a particular application.

In the case where the transmitter driver 25 employs frequency division multiplexing to drive the transmitter coils 17, 19 and 21, it is advantageous for the compensation driver 27 to operate in such a way that the current levels at each frequency are adjusted so that optimum edge field suppression is obtained for each of the transmitter coils 17, 19 and 21 when they are individually activated. For this configuration, the level of energization for each frequency may be optimized to produce a minimal magnetic field in a strategic region outside the operating volume, where metallic objects typically reside in a particular application.

Although the first embodiment of the present invention shows the use of three transmitter coils 17, 19 and 21 arranged as best seen in FIG. 2, a number of transmitter coils other than three may be employed, with the only restriction being that the number of transmitter axes times the number of sensor axes be at least equal to the desired number of degrees of freedom to be measured by the system 10.

If desired, the transmitter coils may be provided in shapes other than circular to comply with design requirements. The transmitter coils may also comprise structures other than coils such as, for example, permanent magnets. The transmitter coils may also be provided in parallel or aparallel magnetic axes. If desired, one or more of the coils may overlap other one(s) of the coils.

The transmitter may be activated using any one of a variety of power sources causing the transmitter to produce a magnetic field with a time vs. amplitude characteristic that best suits the system application. Examples of such power sources include those producing alternating current or direct current as well as those providing ramp or exponential waveforms.

If desired, the assembly 10 may be provided devoid of the conductive plate 11 without substantially altering the fundamental nature of the operation of the compensation coil 23. In such an event, the compensation coil 23 would be provided peripheral to the permeable attenuator 13.

The precise location of placement of the compensation coil 23 with respect to the periphery of the conductive plate 11 and permeable attenuator 13 is not highly critical, however, Applicant has found that optimum performance is achieved when compensation coil 23 is placed beyond the extent of the permeable attenuator 13 and extends to the outer periphery of the conductive plate 11. In cases where the conductive plate 11 and permeable attenuator 13 have the same dimensions, the compensation coil 23 may be located along the outer periphery of the conductive plate 11. For a given configuration of the transmitter assembly 10, an initial evaluation for optimal placement of the compensation coil 23 and of the level and characteristics of current driving the compensation coil 23 may be performed using finite element analysis. A prototype transmitter assembly 10 may then be constructed and the desired operational parameters further optimized by trial and error through experimentation.

The compensation coil 23 may comprise an actual two or three dimensional coil structure which has been optimized for a given transmitter configuration. Such a structure includes current carrying elements shaped, spaced and located for optimal edge field cancellation. Current levels used with each element are also optimized. The process of optimization in these cases involves studying the level of magnetic field in undesired regions outside of the operating volume and adjusting the compensation coil geometry or geometries if more than one coil is used, and the respective excitations for each compensation coil relative to a given magnetic field transmitter coil. The effects of the compensation coil magnetic field on the magnitude and shape of the transmitted magnetic field within the operating volume are also considered during the optimization process, such that the overall system characteristics meet operational requirements.

Figure 3:
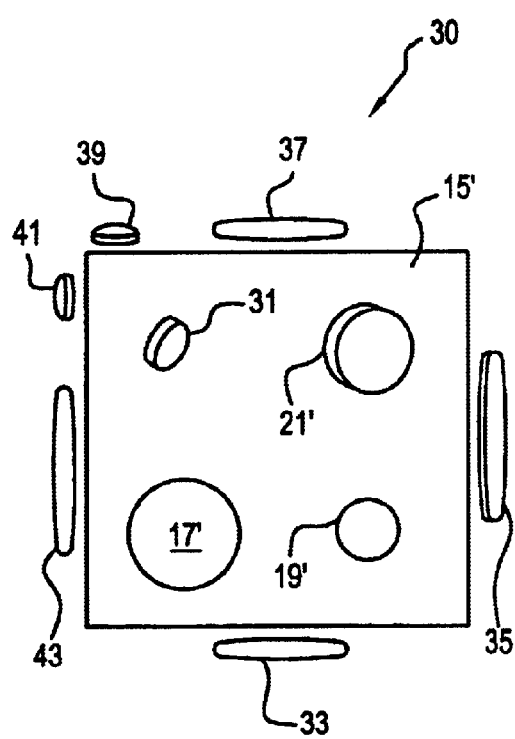
FIG. 3 shows a top view of a second embodiment of the present invention.
Figure 4:
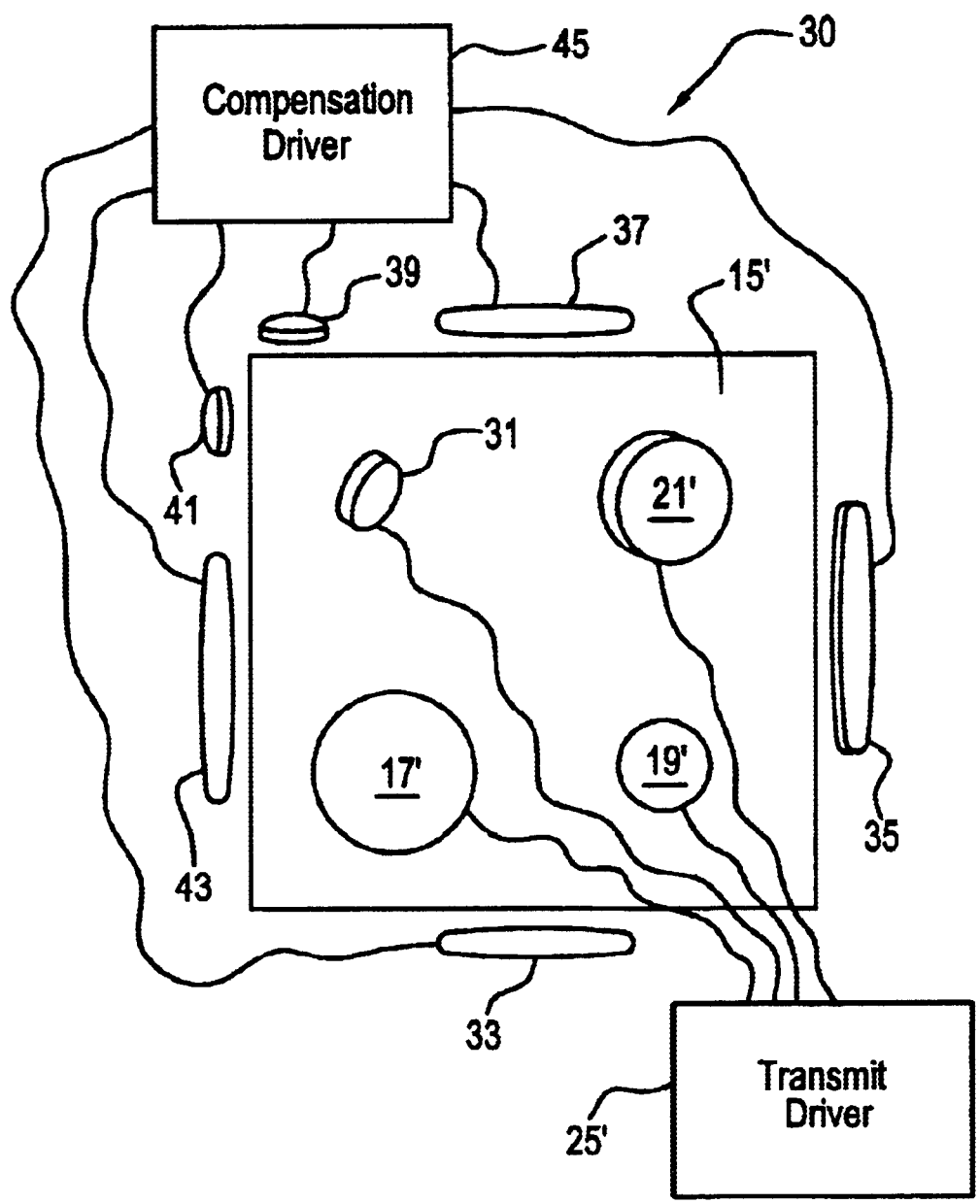
FIG. 4 shows a schematic representation of the embodiment illustrated in FIG. 3 but showing the interconnection of the compensation driver individually to each coil.

Reference is now made to FIGS. 3 and 4 in which like elements are described using like primed reference numerals. The assembly illustrated in FIG. 3 is generally designated by the reference numeral 30 and is seen to include transmitter coils 17', 19', 21' and 31. The transmitter coils are seen placed on a spacer 15'. The permeable attenuator and conductive plate are not shown, although they are present below the spacer 15'. Surrounding the periphery of the assembly 30 are a plurality of compensation coils 33, 35, 37, 39, 41 and 43. With reference to FIG. 4, a transmitter driver 25' drives the transmitter coils 17', 19', 21' and 31. The compensation driver 45 is shown and individually drives each compensation coil 33, 35, 37, 39, 41 and 43. The compensation coils are sized and configured to accommodate to the specific configuration of the transmitter coils, spacer, permeable attenuator, and conductive plate. Such a configuration is provided so that non-uniform edge eddy current fields may be effectively canceled. Areas with differing edge eddy current fields are provided with an optimal number of compensation coils placed in their vicinity and also wherein the compensation coils are provided with desired numbers of turns and orientations and are excited by current characteristics that are specifically designed for each situation. The goal is to provide optimal cancellation of edge eddy current effects from the permeable attenuator.

Through experimentation, Applicant has found that in the first embodiment of the present invention, eddy current distortion field levels in the areas adjacent to and below the transmitter assembly 10 are reduced by a factor of 1.5 for points located in the transmitter plane and positioned two feet away, and a factor of 8 for points located in the transmitter plane and positioned two inches away. This results in reduced excitation of potentially parasitic radiators of eddy currents residing in those areas, thereby resulting in a lower distortion error for the signals received by the sensor (not shown).

In addition, eddy current distortion caused by the conductive plate 11 is totally eliminated. At a point 12 inches above the assembly 10 and centered in the x, y plane, there is a 1.2% reduction in the field intensity. For most applications, the reduction in distortion more than compensates for the loss of field strength. As compared to the embodiment illustrated in FIGS. 1–2, it is expected that the custom tailoring of the compensation coils shown in the embodiment of FIGS. 3 and 4 will enhance the performance of the system 30 over the performance of the system 10.

In either of the embodiments of the present invention as described above, the following modifications may be made:
  (1) The transmitter driver may be the same as the compensation driver;
  (2) The transmitter and compensation coils may be placed in series;
  (3) The transmitter and compensation coils may be placed in parallel;
  (4) Where a conductive plate is employed, the compensation coil may be placed from substantially the edge of the permeable barrier extending beyond and below the edge of the conductive plate.

The present invention also contemplates a method of measuring the position of an object in a prescribed three dimensional space using the embodiments of the present invention as described above.

In particular, those method steps are the following:
  (1) First, a three dimensional space is defined;
  (2) Next, a magnetic field permeable attenuator is located adjacent the space;
  (3) Next, a transmitter is placed on the attenuator facing the space;
  (4) A compensation coil or a series of compensation coils depending upon the embodiment chosen is/are placed about the periphery of the transmitter and attenuator;
  (5) The transmitter and compensation coil are operated with the transmitter transmitting magnetic fields into the three dimensional space which are used to measure the position and orientation of the object while the compensation coil reduces or eliminates eddy current distortions that would affect the accuracy of measurements taken.
  (6) If desired, a conductive plate may be placed under the attenuator and a spacer may be employed between the attenuator and the transmitter coils.
  (7) As explained above, where one compensation coil is employed, the compensation coil driver is activated using current characteristics specifically tailored to the transmitter coil that is concurrently activated. In the case where a plurality of compensation coils are employed, particular ones of the compensation coils are activated using pre-set current characteristics for each transmitter coil that is activated.

As such, an invention has been disclosed in terms of preferred embodiments of the present invention and the method of operating same, which fulfill each and every one of the objects of the invention set forth hereinabove, and provide a new and useful low distortion magnetic transmitter and method of operating of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

What is claimed is:

1. In a magnetic position and orientation measurement system, the improvement comprising means for containing a magnetic field used to conduct measurements of position and orientation of an object, said containing means comprising a magnetic field permeable attenuator located adjacent a region where position and orientation of said object is being measured by a magnetic field, said attenuator attenuating said magnetic field on a side of said attenuator remote from said region, said system including a transmitter located on a side of said attenuator opposite said remote side, and a compensation coil at least partially surrounding said attenuator, and operated concurrently with operation of each transmitter coil to reduce magnetic field distortions peripheral of said attenuator.

2. The system of claim 1, wherein said attenuator is flat.

3. The system of claim 1, wherein said attenuator has a uniform thickness in the range of 0.01 to 0.25 inches.

4. The system of claim 1, wherein said attenuator is made of mumetal.

5. The system of claim 1, further including a spacer between said attenuator and said transmitter coils.

6. The system of claim 1, wherein said compensation coil comprises a single coil.

7. The system of claim 1, wherein said compensation coil comprises a plurality of individual coils spaced in a prescribed pattern about a periphery of said attenuator.

8. The system of claim 1, wherein said transmitter and compensation coil are wired in series.

9. The system of claim 1, wherein said transmitter and compensation coil are wired in parallel.

10. The system of claim 1, wherein a transmitter driver is provided to drive said transmitter coils.

11. The system of claim 10, wherein a compensation coil driver separate from said transmitter driver is provided to drive said compensation coil.

12. The system of claim 10, wherein said transmitter driver also comprises a compensation coil driver adapted to drive said compensation coil.

13. The system of claim 1, further including a conductive plate below laid attenuator with respect to said region.

14. The system of claim 13, wherein said conductive plate has a thickness in the range of 0.1875 to 0.25 inches.

15. The system of claim 13, wherein said conductive plate is made of a non-ferrous metal.

16. The system of claim 15, wherein said non-ferrous metal comprises aluminum.

17. A magnetic position measurement system, comprising:
  a) a thin magnetic field permeable attenuator;
  b) a thin conductive plate below said attenuator;
  c) a thin transmitter above said attenuator, said transmitter capable of measuring in three dimensions;
  d) a compensation coil about the periphery of one of said conductive plate or said attenuator.

18. The system of claim 17, wherein said compensation coil surrounds a periphery of said conductive plate.

19. The system of claim 17, wherein said compensation coil surrounds a periphery of said attenuator.

20. The system of claim 17, wherein said conductive plate is made of aluminum.

21. The system of claim 17, wherein said attenuator is made of mumetal.

22. The system of claim 17, wherein said compensation coil comprises a single coil.

23. The system of claim 17, wherein said compensation coil comprises a plurality of individual coils spaced about a periphery of said conductive plate or permeable, attenuator in a desired pattern.

24. The system of claim 17, wherein said transmitter and compensation coil are wired in series.

25. The system of claim 17, wherein said transmitter and compensation coil are wired in parallel.

26. In a transmitter transmitting a magnetic field in a space to measure position of an object in said space, the improvement comprising a magnetic field permeable attenuator in association with said transmitter and a coil adjacent said attenuator, said coil being activated concurrently with activation of said transmitter to reduce distortions of said magnetic field.

27. The transmitter of claim 26, wherein said magnetic field comprises an electromagnetic field.

28. The transmitter of claim 26, wherein said transmitter transmits field to measure position and orientation of said object in six degrees of freedom.

29. The transmitter of claim 26, wherein said coil completely surrounds said attenuator.

30. The transmitter of claim 26, wherein said coil comprises a plurality of coils spaced about a periphery of said attenuator in a prescribed pattern.

31. The transmitter of claim 26, wherein said transmitter has three mutually orthogonal coils.

32. The transmitter of claim 26, further including a common driver for said transmitter and said coil.

33. The transmitter of claim 26, further including a first driver for said transmitter and a second driver for said coil.

34. The transmitter of claim 26, wherein said attenuator has a periphery, said coil spaced about said periphery of said attenuator.

35. A method of measuring position and orientation of an object in a prescribed three dimensional space, including the steps of:

a) defining a three dimensional space;

b) locating a magnetic field permeable attenuator adjacent said space;

c) placing a transmitter on a side of said attenuator facing said space;

d) locating a compensation coil surrounding said attenuator;

e) operating said transmitter and compensation coil concurrently, and f) measuring position of said object.

36. The method of claim 35, further including the step of locating a spacer between said transmitter and attenuator.

37. The method of claim 35, wherein said compensation coil comprises a plurality of coils and further including the step of operating some of said coils when operating one transmitter coil, and operating others of said compensation coils when operating another of said transmitter coils.

38. The method of claim 35, wherein said locating step includes the step of locating an attenuator made of mumetal.

39. The method of claim 35, wherein said operating step includes the step of providing said transmitter and compensation coil with separate drivers.

40. The method of claim 35, wherein said operating step includes the step of providing said transmitter and compensation coil with a common driver.

41. The method of claim 35, further including the step of wiring said transmitter and compensation coil in series.

42. The method of claim 35, further including the step of wiring said transmitter and compensation coil in parallel.

43. The method of claim 35, further including the step of locating a conductive plate below said attenuator with respect to said space.

44. The method of claim 43, further including the step of providing the conductive plate in the material aluminum.

\* \* \* \* \*